Sept. 26, 1961     O. ZIMMERMANN     3,001,315
FISHING LURES

Filed Aug. 8, 1960     4 Sheets-Sheet 1

INVENTOR
OSKAR ZIMMERMANN
BY Featherstonhaugh Co.
ATTORNEYS.

Sept. 26, 1961 O. ZIMMERMANN 3,001,315
FISHING LURES

Filed Aug. 8, 1960 4 Sheets-Sheet 3

INVENTOR
OSKAR ZIMMERMANN
BY
ATTORNEYS.

Sept. 26, 1961     O. ZIMMERMANN     3,001,315
FISHING LURES

Filed Aug. 8, 1960     4 Sheets-Sheet 4

INVENTOR
OSKAR ZIMMERMANN
BY *Fetherstonhaugh & Co.*
ATTORNEYS.

United States Patent Office 3,001,315
Patented Sept. 26, 1961

3,001,315
FISHING LURES
Oskar Zimmermann, 438 New St., Renfrew,
Ontario, Canada
Filed Aug. 8, 1960, Ser. No. 48,170
4 Claims. (Cl. 43—17.6)

This invention relates to fishing lures.

A primary object of the invention is to provide a fishing lure which can be adapted to emit a flickering light or no light at all while submerged.

It is also an object of the invention to provide a fishing lure which can be adapted to ride on the surface and emit a steady light or no light at all.

A further object of the invention is to provide a fishing lure with deflector means swingable between a downwardly inclined position and an upwardly inclined position with respect to the longitudinal axis of the lure and to provide locking means for locking said deflector means releasably in said upwardly inclined position.

Thus, according to the invention, a fishing lure comprises a hollow body at least partly translucent, an electric circuit including a lamp and a movable contact mounted in said body, a control member secured to said movable contact, transverse deflector means mounted on said body and swingable into engagement with said control member, the control member being movable between a first position in which it allows said contact to be closed and a second position in which it maintains said contact open. Thus in the first-mentioned position of the control member, passage of the lure through the water will cause the deflector means to press on the control member and close the contact. The contact is normally urged to its open position and thus by pulling intermittently on the fishing line the deflector means will cause the lure to emit light intermittently and attract fish to the lure. However, if lighting of the lure is not required, the control member may be moved to its second position and the lure will then emit no light, regardless of the pressure of the deflector means on the control member.

The present invention also provides a lure which may be adapted for diving or surfacing and for this purpose is provided with deflector means swingable between a downwardly inclined position and an upwardly inclined position with respect to the longitudinal axis of the lure, a locking arm integral with the deflector means, and a control member swingably mounted on the lure and adapted to engage the locking arm in the upwardly inclined position of the deflector means to lock the deflector means releasably in said position.

In a preferred embodiment of the invention the control member for the movable contact serves also to lock the deflector means in an upwardly inclined position either with the movable contact open or closed, the control member being moved to a third position to achieve the latter effect.

An embodiment of the invention will now be described, by way of example, with reference to the accompanying drawings, in which.

Figure 1:
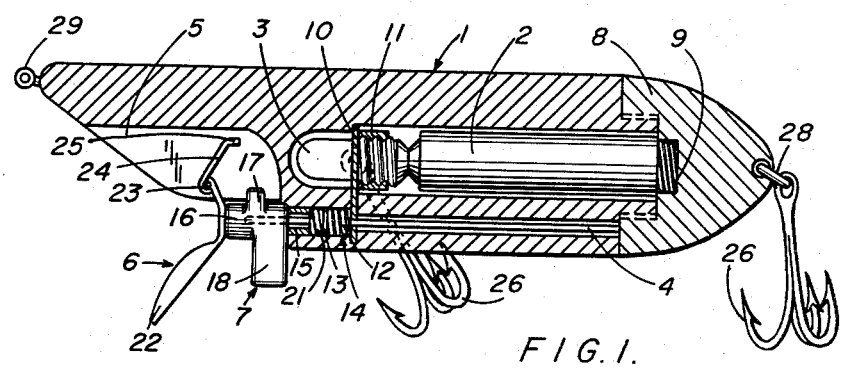
FIGURE 1 is a diagrammatic sectional side elevation of a fishing lure.

The fishing lure comprises a hollow body 1 housing an electric circuit including battery 2, lamp 3 and movable contact 4, the body being recessed as at 5 at its front end to accommodate deflector means 6 and a control member 7 connected to the movable contact 4.

The rear end of body 1 is closed by a cap 8 of electrically conducting material and a spring 9 is interposed between this cap and the battery 2 to ensure good contact therebetween. The movable contact 4 is in the form of a wire or rod extending through the body 1 and movable into or out of engagement with the cap 8 and the bulb is maintained in constant contact with the movable contact 4 by a metal strip 10 through which contact 4 slides and which is engaged by a sleeve 11 screwed onto the base of the lamp.

It will be readily apparent that the lamp can be lit intermittently by intermittent contact between rod 4 and cap 8 or can be lit constantly by maintaining rod 4 and cap 8 in constant contact or can be maintained constantly unlit by preventing contact of rod 4 and cap 8. A spring 12 disposed around rod 4 between metal strap 10 and a fixed flange 13 on the rod 4 serves normally to urge the rod 4 out of contact with the cap 8. Spring 12 and flange 13 are housed in a bore 14 and rod 4 extends through this bore and beyond same into recess 5. The outer end of bore 14 is closed by an annular plug 15. The control member 7 is mounted on the end of rod 4 which projects into the recess 5.

The control member comprises a cylindrical body portion 16 and two diametrically opposed lateral projections 17 and 18. Recess 5 is stepped transversely to provide two longitudinally spaced rear faces 19 and 20 and the front faces of projections 17 and 18 are longitudinally spaced a distance equal to that between faces 19 and 20. The rear face of projection 18 forms an extension of the rear face of body 1 and thus it will be apparent that when the rear face of projection 18 abuts face 19 the front face of projection 18 will lie in the plane which is occupied by the front face of projection 17 when the rear face of projection 18 abuts face 20. A compression spring 21 is interposed between flange 13 and plug 15 around rod 4 so as to be compressed when the rear face of projection 18 abuts face 19 and thus hold the control member in position with said faces abutting.

The deflector means 6 comprises a vane 22 pivotally mounted on the lure by means of a pivot pin 23, extending between the side walls of an upwardly extending portion of recess 5, and a locking arm 24 extending from pivot pin 23 in a direction away from the vane 22 and having an offset end portion 25. The locking arm 24, in the upwardly inclined position of vane 22, is adapted to engage with the front face of either projection 17 or projection 18 in alternative position of control member 7, whereby the vane may be locked in said upwardly inclined position.

Gang hooks 26 are attached to lateral extensions 27 of metal strip 10 and to a ring 28 on cap 8. A ring 29 is affixed to the front of the lure for attachment of the fishing line.

The operation of the lure will now be described with reference to FIGURES 3 through 10.

Figure 3:
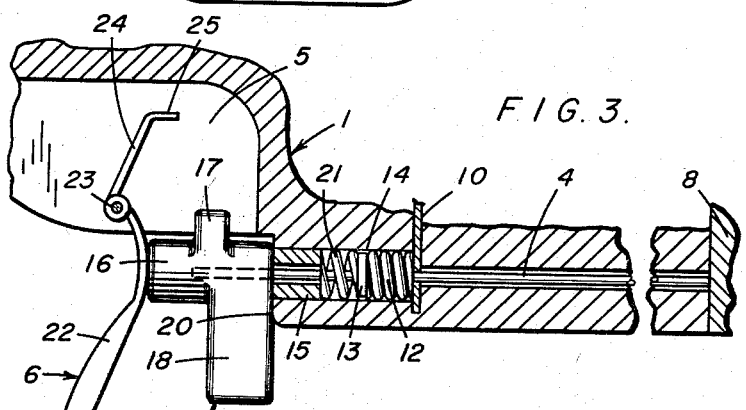
FIGURE 3 is a fragmentary sectional side elevation showing the lure adapted for diving with intermittent emission of light.
Figure 4:
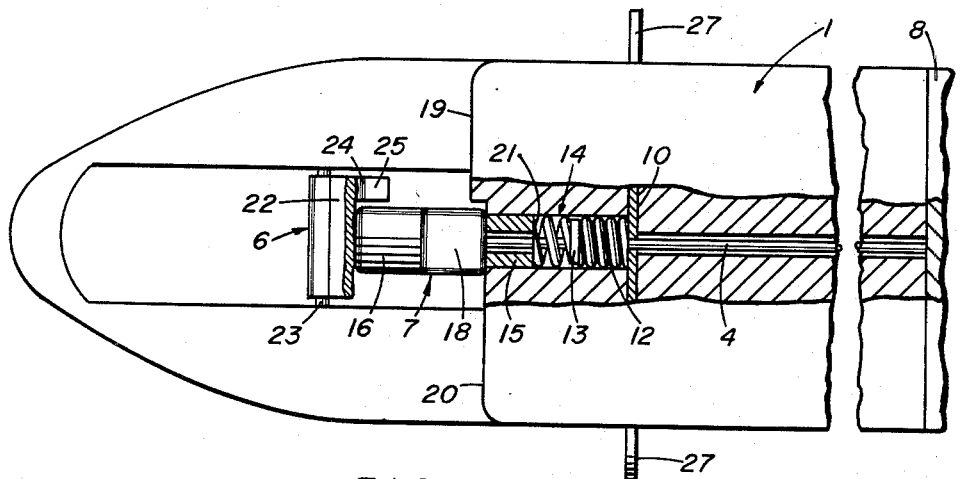
FIGURE 4 is an obverse plan view corresponding to FIGURE 3.

With the deflector means 6 and control member 7 in the positions shown in FIGURES 3 and 4 the lure is adapted for intermittent emission of light on passage of the lure through the water. Thus, when the lure is pulled forward the water pressure acting upon vane 22 will cause same to act upon the front face of body portion 16 of control member 7, forcing rod 4 into contact with cap 8 against the action of spring 12. However, when the pull on the lure is relaxed, spring 12 will again push rod 4 forwards out of contact with the cap 8. The circuit to lamp 3 is thus made and broken intermittently.

Figure 5:
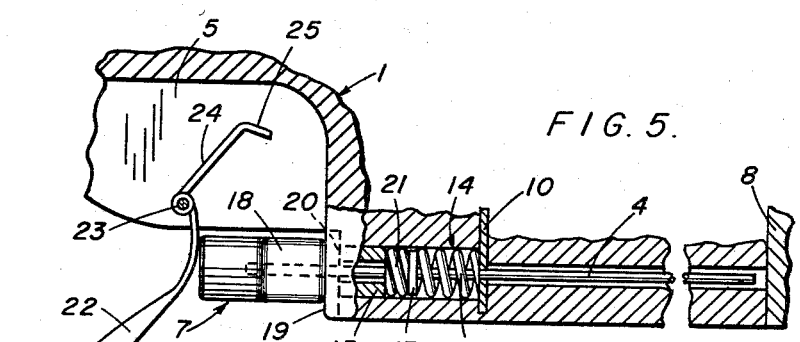
FIGURE 5 is a view similar to FIGURE 3 but showing the lure as adapted for diving without emission of light.
Figure 6:
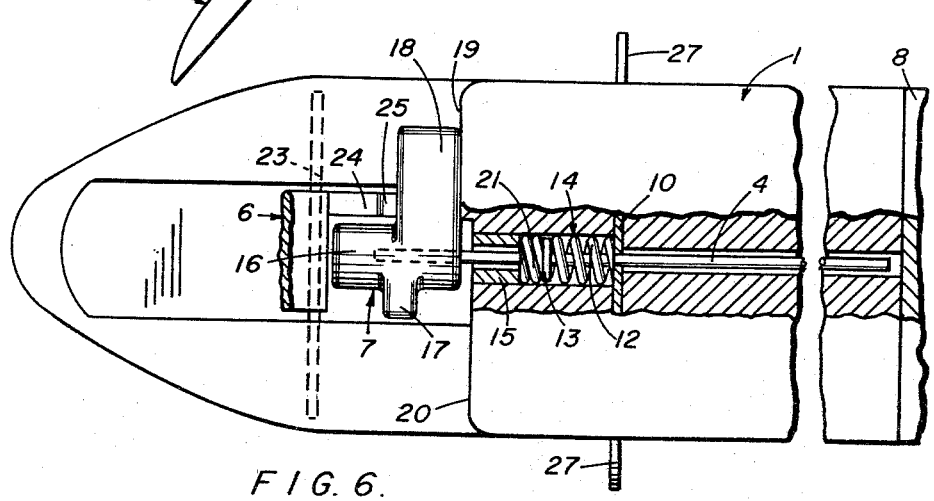
FIGURE 6 is an obverse plan view corresponding to FIGURE 5.
Figure 2:
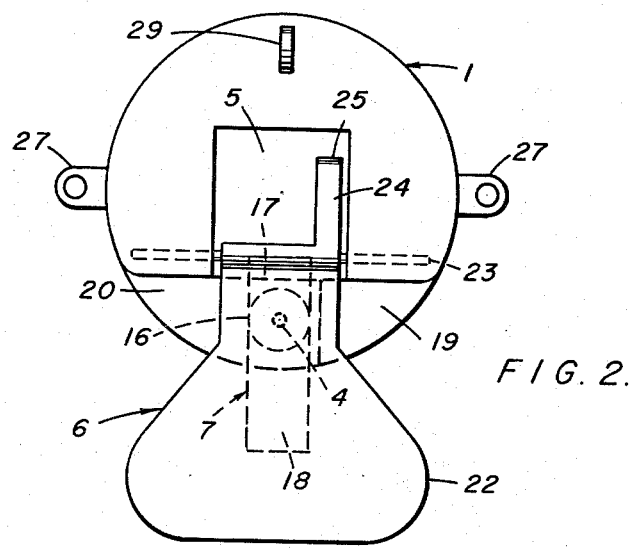
FIGURE 2 is a front end view of the fishing lure.

As shown in FIGURES 5 and 6, by pulling control member 7 forwardly and pivoting it so that the rear face of projection 18 abuts face 19 of the lure the rod 4 can be held out of contact with cap 8, the control member 7 being held in this position under the action of spring 21 compressed between plug 15 and flange 13. The lure is thus adapted for diving without emission of light since the circuit for lamp 3 is constantly open.

Figure 7:
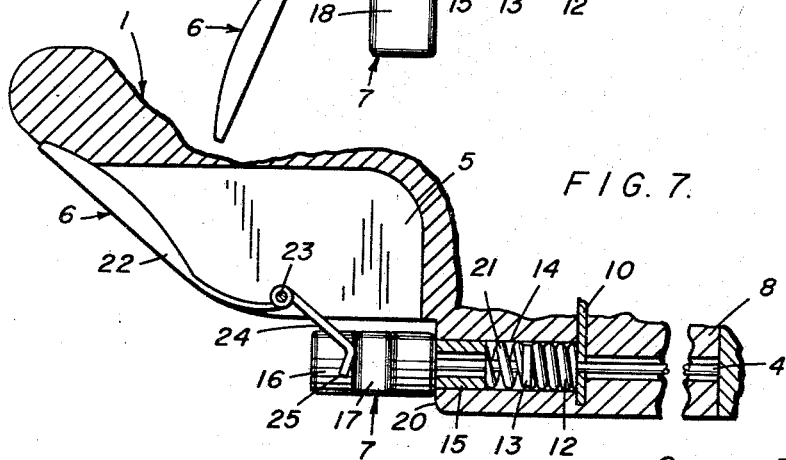
FIGURE 7 is a view similar to FIGURES 3 and 5 but showing the lure adapted for surfacing with constant emission of light.
Figure 8:
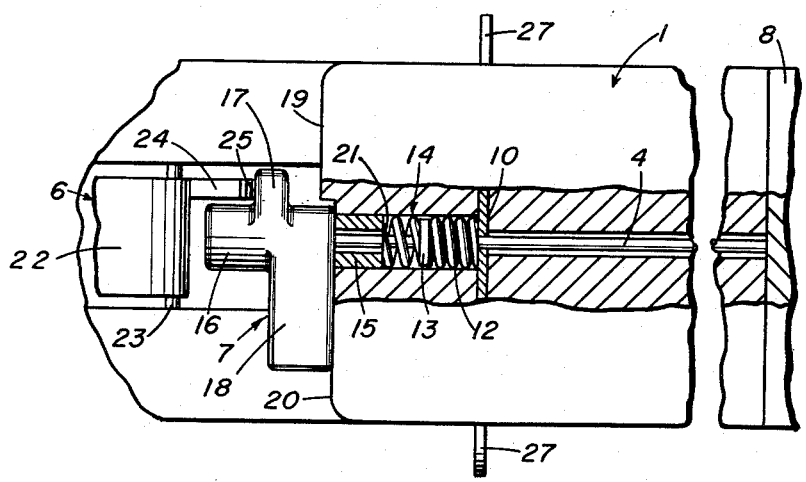
FIGURE 8 is an obverse plan view corresponding to FIGURE 7.

Referring now to FIGURES 7 and 8, it will be seen that in the illustrated position of deflector means 6 and control member 7 the lure is adapted for surfacing with constant emission of light. To achieve this condition the deflector means 6 is pivoted so that vane 22 is in an upwardly inclined position and control member 7 is then pivoted to bring the front face of projection 17 into engagement with the locking arm 24. In this position the rod 4 is held in contact with cap 8 and lamp 3 is thus constantly illuminated.

Figure 9:
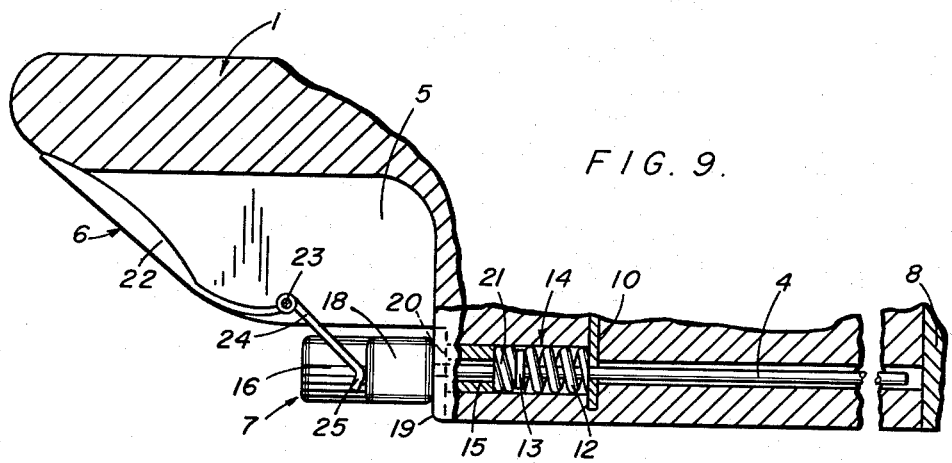
FIGURE 9 is a view similar to FIGURES 3, 5 and 7 but showing the lure adapted for surfacing without emission of light.
Figure 10:
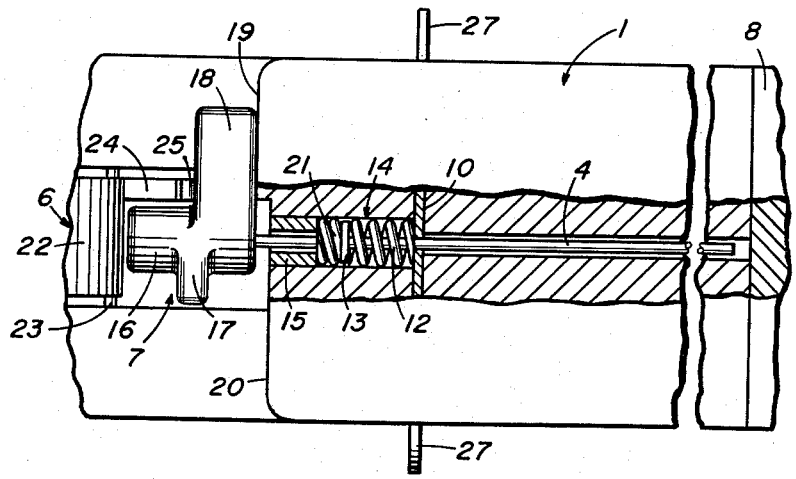
FIGURE 10 is an obverse plan view corresponding to FIGURE 9.

Finally, as shown in FIGURES 9 and 10, the lure can be adapted for surfacing without emission of light. To achieve this the deflector means is pivoted into the position shown and the control member 7 is pulled forwardly and pivoted to bring projection 18 between locking arm 24 and the face 19. As previously mentioned, the front face of projection 18 now lies in the plane occupied by the front face of projection 17 in the position illustrated in FIGURES 7 and 8. Thus, the same locking action is achieved in either position of the control member.

What I claim as my invention is:

1. A fishing lure comprising a hollow body, at least a portion of which is translucent, a lamp and an electric circuit for energizing said lamp mounted in said body, a contact in said electric circuit movable between open and closed positions, a control member secured to said movable contact, said body having a recess in its outer surface to accommodate said control member, transverse deflector means pivotally mounted in said recess and swingable downwardly and rearwardly into engagement with said control member, first resilient means normally urging said contact into its open position but yieldable to allow the contact to close under pressure of said deflector means on the control member on passage of the lure through the water, an abutment in said recess adjacent the control member, means retaining said control member and said contact against removal from the lure, said control member being pivotable into engagement with said abutment when said contact is in open position, and second resilient means serving to retain the control member in engagement with said abutment, whereby the contact may be held open regardless of the pressure exerted by the deflector means on the control member.

2. A fishing lure as claimed in claim 1, wherein said deflector means is swingable between a downwardly inclined position and an upwardly inclined position with respect to the longitudinal axis of the lure and wherein means are provided for locking the deflector means releasably in said upwardly inclined position, said locking means comprising an arm integral with said deflector means and longitudinally spaced lateral projections on said control member alternatively engageable with said arm on pivotal movement of the control member, whereby the deflector means may be locked in the open and closed positions of said contact, engagement of said arm with one of said projections also locking said contact in its closed position.

3. A fishing lure comprising a body, deflector means pivotally mounted on said body for movement between a downwardly inclined position and an upwardly inclined position with respect to a longitudinal axis of said body, a locking arm integral with said deflector means, a control member swingably mounted on said body and adapted to engage said locking arm in the upwardly inclined position of the deflector means to lock the deflector means releasably in the latter position, said body being at least partly translucent and having mounted therein a lamp and an electric circuit for energizing the lamp, a movable contact adapted to open and close said circuit, and resilient means normally urging said contact to its open position, said control member being connected to said contact and being engageable by said deflector means in its downwardly inclined position, whereby, in one position of said control member and on passage of the lure through the water, said contact may be closed by the pressure of the water on said deflector means.

4. A fishing lure as claimed in claim 3, wherein retaining means is provided to retain said control member and movable contact against removal from the lure body and wherein an abutment is provided on the lure body, said abutment being engaged by said control member in one position of the latter, a spring being provided to retain the control member in said one position, the contact being held in its open position by the control member in said one position, regardless of engagement of the control member by the deflector means.

References Cited in the file of this patent
UNITED STATES PATENTS

| 2,500,442 | Waite | Mar. 14, 1950 |
| 2,723,483 | Jepson | Nov. 15, 1955 |
| 2,897,623 | Flournoy | Aug. 4, 1959 |